(12) United States Patent
Gavryushin et al.

(10) Patent No.: US 12,325,795 B2
(45) Date of Patent: Jun. 10, 2025

(54) SILICONE RUBBER FORMULATIONS WITH TUNABLE DAMPING PROPERTIES AND METHOD OF PREPARATION THEREOF

(71) Applicant: Apple Inc., Cupertino, CA (US)

(72) Inventors: Andrei Gavryushin, Munich (DE); Christian Bertl, Munich (DE); Juergen Sauer, Munich (DE)

(73) Assignee: Apple Inc., Cupertino, CA (US)

( * ) Notice: Subject to any disclaimer, the term of this patent is extended or adjusted under 35 U.S.C. 154(b) by 710 days.

(21) Appl. No.: 17/584,709

(22) Filed: Jan. 26, 2022

(65) Prior Publication Data

US 2022/0243063 A1 Aug. 4, 2022

Related U.S. Application Data

(60) Provisional application No. 63/286,878, filed on Dec. 7, 2021, provisional application No. 63/143,656, filed on Jan. 29, 2021.

(51) Int. Cl.
| | | |
|---|---|---|
| *C08L 83/04* | (2006.01) | |
| *C08G 77/00* | (2006.01) | |
| *C08G 77/08* | (2006.01) | |
| *C08G 77/20* | (2006.01) | |
| *C08K 3/36* | (2006.01) | |
| *C08K 5/5445* | (2006.01) | |
| *C08K 5/548* | (2006.01) | |

(52) U.S. Cl.
CPC .............. *C08L 83/04* (2013.01); *C08G 77/08* (2013.01); *C08G 77/20* (2013.01); *C08G 77/80* (2013.01); *C08K 3/36* (2013.01); *C08K 5/5445* (2021.01); *C08K 5/548* (2013.01); *C08G 2350/00* (2013.01); *C08L 2312/06* (2013.01)

(58) Field of Classification Search
None
See application file for complete search history.

(56) References Cited

U.S. PATENT DOCUMENTS

2011/0306746 A1* 12/2011 Tanaka .................... C08L 83/04
528/31

FOREIGN PATENT DOCUMENTS

JP         2004307829 A  * 11/2004

* cited by examiner

*Primary Examiner* — Richard A. Huhn
(74) *Attorney, Agent, or Firm* — BakerHostetler

(57) ABSTRACT

Cured silicone rubbers for acoustic damping, and formulations and methods used to make the same, are provided.

46 Claims, 7 Drawing Sheets

SILICONE RUBBER FORMULATIONS WITH TUNABLE DAMPING PROPERTIES AND METHOD OF PREPARATION THEREOF

PRIORITY

This patent application claims the benefit under 35 U.S.C. § 119(e) of U.S. Patent Application Ser. No. 63/143,656, entitled "SILICONE RUBBER FORMULATIONS WITH TUNABLE DAMPING PROPERTIES AND METHOD OF PREPARATION THEREOF," filed on Jan. 29, 2021, and U.S. Patent Application Ser. No. 63/286,878, entitled "SILICONE RUBBER FORMULATIONS WITH TUNABLE DAMPING PROPERTIES AND METHOD OF PREPARATION THEREOF," filed on Dec. 7, 2021, both of which are incorporated herein by reference in their entirety.

BACKGROUND

Silicone elastomers, also known as silicone rubbers, appear frequently in industrial products such as flexible baking molds, bathroom sealants, skin adhesives, cosmetics and noise dampers for car brakes. Silicone elastomers are also extensively used in advanced technologies, in the form of stretchable electronics, drug delivery vehicles, super-hydro-phobic surfaces and implants. Such a wide range of application requires silicone elastomers with diverse properties.

In an audio speaker design, membrane materials able to damp particular frequencies can be included as speaker components. Speakers can show unfavorable oscillation modes of the diaphragm, leading to a distorted acoustic output. A reduction of their amplitudes by damping improves therefore the quality of the sound.

In silicone rubbers, an increased damping coefficient (tan δ) is mainly achieved by the addition of filler materials as, for example, carbon black, fumed silica, titanium dioxide. These filler materials do not allow for damping properties to be tuned with precision. For several applications in electronic devices, it is highly desirable to use a material with damping properties depending on the oscillation frequency in an predictable and adjustable manner.

Further, production of conventional silicone elastomers comes with manufacturing limitations. Materials with high viscosity can be difficult to manufacture. Polymerization uses high temperatures, often requires expensive materials, and can have a lengthy polymerization time window.

The disclosure addresses these and other needs.

SUMMARY

In one aspect, the disclosure is directed to a cured silicone rubber. The cured silicone rubber is a cure of 1-99% poly-N1,N2-siloxane polymer, wherein, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl; and 1-99% poly(dimethyl)(diphenyl)siloxane copolymer having 5 mol %-70 mol % diphenylsiloxane. In certain variations, the poly-N1, N2-siloxane polymer can be polydimethylsiloxane. In different variations, the cured silicone rubber can include 1 mol % to 70 mol % copolymer, 5 mol % to 50 mol % copolymer, from 10 mol % to 30 mol % copolymer. In certain variations, the copolymer comprises from 30 mol % to 50 mol % diphenylsiloxane. The cured silicone rubber can have a maximum damping coefficient (tan δ) in the frequency range below 20 kHz.

In another aspect, the disclosure is directed to a formulation of a polymer and a copolymer. The copolymer can be 1-99% poly(dimethyl)(diphenyl)siloxane comprising between 5 and 70 mol % diphenylsiloxane and bearing an unsaturated moiety such as a vinyl substituent or a norbomyl substituent. The polymer can be 1-99% poly-N1,N2-siloxane polymer and bearing an unsaturated moiety such as a vinyl substituent or a norbomyl substituent, wherein N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl. In certain variations, the poly-N1,N2-siloxane polymer is polydimethylsiloxane. In additional variations, the copolymer can include from 30 mol % to 50 mol % diphenylsiloxane. The formulation can be a liquid.

In another aspect, the disclosure is directed to a method of making poly(dimethyl)(diphenyl)siloxane copolymer. The poly(dimethyl)(diphenyl)siloxane copolymer can have 30 mol %-50 mol % diphenylsiloxane. Octaphenylcyclotetrasiloxane and octamethylcyclotetrasiloxane are combined in the presence of potassium hexamethyldisilazide, and a promotor to form a mixture. The octaphenylcyclotetrasiloxane and octamethylcyclotetrasiloxane are polymerized to obtain a copolymer. The copolymer can be functionalized to form a copolymer bearing an unsaturated moiety. In some variations, the unsaturated moiety is selected from a vinyl substituent or a norbomyl substituent. In additional variations, polymerization can be at a temperature of 130-160° C. Instill further variations, the method can include one or more steps of dissolving the copolymer in a solvent, adding a silytion agent and optionally a base, and precipitation the polymer (e.g., with an aliphatic alcohol).

In another aspect, the disclosure is directed to a speaker in which the cured silicone rubber is operably linked to a diaphragm. The disclosure is further directed to an apparatus including the speaker.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
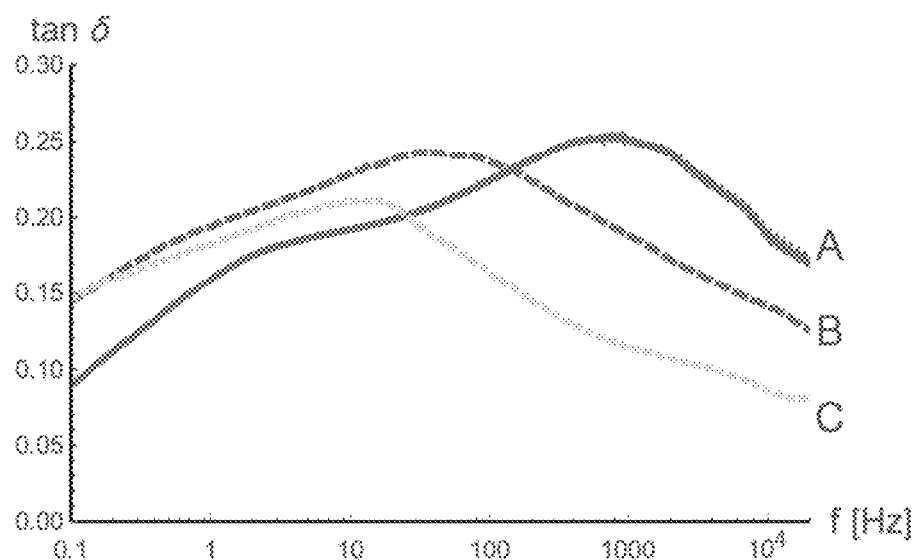
FIG. 1A depicts the tangent of the loss angle (tan δ) for the three cured silicone rubbers depicted in Table 1.

The disclosure is directed to cured silicone rubber materials with high damping properties. The cured silicone rubber materials are configured to damp particular acoustic frequencies or ranges of frequencies, and possess a defined maximum on the frequency-damping curve in the frequency range 1-20,000 Hz.

In some variations, the cured silicone rubber materials can be tunable over a wide frequency range based on selection of co-polymer substituents. The cured silicone rubber can be prepared by a quick curing process at ambient temperature, without requiring complex heating/cooling machinery and/or prolonged time. Curing isothermally at ambient temperature can also reduce variations in properties of the silicone rubber due to temperature differences.

Damping can be described as the loss factor equal to the tangent of the loss angle (tan δ). The loss factor characterizes the fraction of dissipated energy to stored energy during one oscillation cycle. A high loss factor is favorable when unwanted oscillations are suppressed, or if a resonance is flattened.

In some variations, the cured silicone rubbers as described herein can be a cure of dimethylsiloxane polymer and a poly(dimethyl)(diphenyl)siloxane copolymer containing 30-50 mol % diphenylsiloxane groups. The dimethylsiloxane and diphenylsiloxane groups are randomly distributed in the copolymer. The position of the tan δ maximum in the frequency range can be determined by the content of diphenylsiloxanes in the copolymer or cured silicone rubber, and can be tuned by changing the diphenylsiloxane percentage. As used herein, poly(dimethyl)(diphenyl)siloxane copolymer, poly(dimethylsiloxane)(diphenylsiloxane) copolymer, and poly(dimethyl-diphenylsiloxane copolymer are used interchangeably.

Methods of Synthesis

In general, silicone rubber parts can be manufactured by pressing a polymer and copolymer formulation as described herein into a mold, followed by a curing process in which bonds between different oligomers are formed on a molecular scale resulting in a cured silicone rubber.

In some variations, the disclosure is directed to a process for preparing cured silicone rubber articles and composite parts from a liquid silicone rubber formulation. Liquid curable silicone rubber formulations can cure or react to provide a cured silicone rubber, also known as a cured silicone elastomer ("elastomer" and "rubber" are used interchangeably herein).

The cured silicone rubbers described herein can be prepared by curing the optionally substituted polydimethylsiloxane bearing an unsaturated moiety and poly(dimethyl)(diphenyl)siloxane bearing an unsaturated moiety. In various aspects, the unsaturated moiety can be a vinyl substituent or a norbornyl substituent. By bearing an unsaturated moiety, it will be recognized that a polymer or copolymer can bear one more unsaturated moiety group, or one or more specific kind of unsaturated moiety, without limitation. Adding an unsaturated moiety, as described herein, can also be referred to as functionalizing a polymer or copolymer. A photoinitiator is added, optionally filler material, and optionally curing agent. UV radiation is applied to cure the silicone rubber at ambient temperature. As used herein, ambient temperature is at least 20° C. and no greater than 30° C., alternatively at least 23° C. and no greater than 28° C., alternatively about 25° C.

In various aspects, UV curing the to form the cured silicone rubber can occur in one minute or less. In some variations, the curing can be accomplished in not more than 30 seconds. In some cases, curing can be accomplished in not more than 20 seconds. In further variations, curing can be accomplished in not more than 10 seconds.

Selecting a poly(dimethyl)(diphenyl)siloxane copolymer containing 30-50 mol % diphenylsiloxane groups can result in both high damping (maximum of tan δ) in the 1-20000 Hz range in the cured silicone rubber and a low viscosity sufficient for processing, at ambient temperature, on the rapid time scale described herein. UV radiation promotes radical thiol-ene addition reaction, using a thiol-containing siloxane as a curing agent, also referred to herein as "linker", and photoinitiators (e.g., Irgacure TPO or other commercially available compounds).

In some variations, the curable silicone rubber formulations can include polydimethylsiloxane (PDMS) of various molecular weights, bearing internal and/or terminal vinyl groups to allow for an addition reaction with a linker with the formation of 3-dimensional cured polymer. The cured silicone rubber can possess certain properties, such as elasticity and hardness.

Pure PDMS, as well as commercially available PDMS with 1.5 mol % to 25 mol % of diphenylsiloxane, may not be not suitable for the preparations of rubber for tunable damping applications such as acoustics, as they possess a maximum on the frequency-damping curve in the area of several MHz, far beyond the useful frequency range.

Increase of diphenylsiloxane content in PDMS (or substituted PDMS) above 25% for the polymers a molecular weight greater than 20-25 kDa can give materials with very high viscosity in the uncured state. Thus, such materials may not be suitable for the preparation of moldable silicone rubber formulations, as it exceeds 5,000 Pa·s.

Copolymer Synthesis

In some variations, the copolymer can be prepared by polymerizing a mixture of octaphenyl- and octamethylcyclotetrasiloxanes, catalyzed by potassium hexamethydisilazide in the presence of tetraalkylureas as promotors, followed by the functionalization of the obtained copolymer. The copolymer can be dissolved in an ethereal solvent and precipitated, such as alcohol precipitation. Adjusting the ratio of octaphenyl- and octamethylcyclotetrasiloxanes in the starting composition allows for preparation of the copolymer with a diphenylsiloxane content between 30 and 50 mol %.

In some variations, polydimethylsiloxane-diphenylsiloxane copolymers, in some cases having diphenylsiloxane content over 30 mol %, can be prepared by the polymerization of a mixture of octaphenyl- and octamethylcyclotetrasiloxanes. For example, the octaphenyl- and octamethylcyclotetrasiloxanes can be polymerized in the presence of potassium hexamethyldisilazide and polymerization promotors at temperatures 130-160° C. Subsequently, the resulting product can be dissolved in an ethereal solvent, and a silylation agent can be added. The resulting product can be alcohol-precipitated, for example by using an aliphatic alcohol.

In some variations, the promotor is a substituted tetraalkylurea (e.g., such as 1,3-dimethylimidazolidinone).

In some variations, the ethereal solvent is selected from tetrahydrofuran, 2-methyltetrahydrofuran, cyclopentyl methyl ether, diethoxymethane, dipropoxymethane, tert-amyl methyl ether, tert-butyl ethyl ether. In some embodiments, the ethereal solvent is 2-methyltetrahydrofuran.

In some variations, the silylation agent is a substituted chlorodialkylsilane or aminodialkylsilane. In a some embodiments, the sililatyng agent is vinyldimethylchlorosilane. Non-limiting examples of bases can include triethylamine, pyridine, diisopropylethylamine and other substances known in the art.

Curing Silicone Rubbers

Curable silicone elastomer formulations are often platinum cured silicone elastomers (which use for curing the addition reaction known in the art as "hydrosilylation"). However, platinum catalysis for the rubber curing process can be toxic and costly. The catalyst also can remain in the final cured silicone rubber. Platinum catalyzation usually requires high temperature, and conventional UV-curable silicones need either increased temperature or prolonged cure time. In mass production, this results in lengthy production cycles, likelihood of errors, and requirement for expensive molding equipment. Thus, curing at ambient temperature has significant advantages.

The formulation can include a poly(dimethylsiloxane)(diphenylsiloxane) copolymer having a diphenylsiloxane content of 5 mol %-70 mol %. In still further variations, the copolymer has between 30 mol % and 50 mol % diphenylsiloxane. As described above, unlike commercially curable silicone elastomers, silicone rubber with the having selectively high damping in 1-20000 Hz range and a viscosity usable for preparation of liquid silicone rubber compositions, can be obtained curing a formulation having functionalized dimethylsiloxane-diphenylsiloxane copolymer with diphenylsiloxane content of 30-50 mol %, and PDMS (optionally substituted).

In some variations, the copolymer can have a diphenylsiloxane content of at least 5 mol %. In some variations, the copolymer can have a diphenylsiloxane content of at least 15 mol %. In some variations, the copolymer can have a diphenylsiloxane content of at least 25 mol %. In some variations, the copolymer can have a diphenylsiloxane content of at least 30 mol %. In some variations, the copolymer can have a diphenylsiloxane content of at least 35 mol %. In some variations, the copolymer can have a diphenylsiloxane content of at least 40 mol %. In some variations, the copolymer can have a diphenylsiloxane content of at least 45 mol %. In some variations, the copolymer can have a diphenylsiloxane content of at least 50 mol %. In some variations, the copolymer can have a diphenylsiloxane content of at least 60 mol %.

In some variations, the copolymer can have a diphenylsiloxane content of no greater than 70 mol %. In some variations, the copolymer can have a diphenylsiloxane content of no greater than 60 mol %. In some variations, the copolymer can have a diphenylsiloxane content of no greater than 55 mol %. In some variations, the copolymer can have a diphenylsiloxane content of no greater than 50 mol %. In some variations, the copolymer can have a diphenylsiloxane content of no greater than 45 mol %. In some variations, the copolymer can have a diphenylsiloxane content of no greater than 40 mol %. In some variations, the copolymer can have a diphenylsiloxane content of no greater than 35 mol %. In some variations, the copolymer can have a diphenylsiloxane content of no greater than 30 mol %. In some variations, the copolymer can have a diphenylsiloxane content of no greater than 25 mol %. In some variations, the copolymer can have a diphenylsiloxane content of no greater than 15 mol %.

In some variations, the copolymer comprises from 5 mol % to 50 mol % diphenylsiloxane. In further variations, the copolymer comprises from 30 mol % to 50 mol % diphenylsiloxane. In still further variations, the copolymer comprises from 15 mol % to 40 mol % diphenylsiloxane.

In some variations, the ratio of poly(dimethyl)(diphenyl)siloxane copolymer and PDMS (optionally substituted) is no greater than 3:1. In some variations, the ratio is no greater than 2:1. In some variations, the ratio is no greater than 1:1. In some variations, the ratio is no greater than 1:2. In some variations, the ratio is no greater than 1:5. In some variations, the ratio is no greater than 1:10. In some variations, the ratio is no greater than 1:15. In some variations, the ratio is no less than 1:20. In some variations, the ratio is no less than 1:15. In some variations, the ratio is no less than 1:10. In some variations, the ratio is no less than 1:5. In some variations, the ratio is no less than 1:20. In some variations, the ratio is no less than 1:2. In some variations, the ratio is no less than 1:1. In some variations, the ratio is no less than 2:1. In some variations, the ratio is between 2:1 to 1:20. In a variations, the proportion is between 1:10 and 1:2.

In some variations, the PDMS polymers in the composition may beside methyl contain ethyl, octyl, phenylethyl, trifluoropropyl, and other substituents known in the art. For example, the PDMS polymer as described herein can be poly-N1,N2-siloxane polymer, wherein, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl.

In some variations, the formulation viscosity is no greater than 5,000 Pa·s. In some variations, the formulation viscosity is no greater than 4,500 Pa·s. In some variations, the formulation viscosity is no greater than 4,000 Pa·s. In some variations, the formulation viscosity is no greater than 3,500 Pa·s. In some variations, the formulation viscosity is no greater than 3,000 Pa·s. In some variations, the formulation viscosity is no greater than 2,500 Pa·s. In some variations, the formulation viscosity is no greater than 2,000 Pa·s. In some variations, the formulation viscosity is no greater than 1,500 Pa·s. In some variations, the formulation viscosity is no greater than 1,000 Pa·s. In some variations, the formulation viscosity is no greater than 500 Pa·s. In some variations, the formulation viscosity is no greater than 300 Pa·s. In some variations, the formulation viscosity is no greater than 100 Pa·s. In some variations, the formulation viscosity is at least 100 Pa·s. In some variations, the formulation viscosity is at least 300 Pa·s. In some variations, the formulation viscosity is at least 500 Pa·s. In some variations, the formulation viscosity is at least 1,000 Pa·s. In some variations, the formulation viscosity is at least 1,500 Pa·s. In some variations, the formulation viscosity is at least 2,000 Pa·s. In some variations, the formulation viscosity is at least 2,500 Pa·s. In some variations, the formulation viscosity is at least 3,000 Pa·s. In some variations, the formulation viscosity is at least 3,500 Pa·s. In some variations, the formulation viscosity is at least 4,000 Pa·s. In some variations, the formulation viscosity is at least 4,500 Pa·s. In some variations, the formulation viscosity is at least 500 Pa·s and no greater than 1, 500 Pa·s.

In some variations, the formulation can include other materials. For example, the formulation can optionally include curing agents, fillers, viscosity regulators, chain extenders, catalysators, dyes, and other additives known in the art.

The formulation can include a catalyst. In some variations, the catalyst is a radical initiator for a thiol-ene cure reaction or a platinum compound for hydrosilylation cure reaction. In particular variations, the catalyst is a radical initiator for a thiol-ene cure reaction.

The formulation can include a filler material, for example, a filler material is selected from carbon black, fumed silica, and titanium dioxide. In particular variations, the filler material is fumed silica.

A curing agent contain a thiol hydridosilane moiety can be added to the formulation. In some variations, the curing agent has between 2 and 100 mercapto groups in the molecule. In more specific variations, the curing agent is a dialkylsiloxane, containing between 3 and 10 mercapto groups in the molecule. In a more specific variation, the curing agent is 1,3,5,7-tetramethyl-1,3,5,7-tetra(3-mercaptopropyl)cyclotetrasiloxane. In some variations, the curing agent is mercaptopropysiloxane oligomer (e.g., SMS-992 from Gelest).

In some variations, the silicone material with adjustable damping in acoustic frequency range can also be obtained by methylhydrosiloxane copolymer as a cross-linker and platinum as a catalyst, as is understood in the art. Platinum catalysts can be activated either by temperature or light. If temperature, the composition can also include an inhibitor of platinum cure to ensure a sufficient pot life.

An example of preparation of a silicone material with a damping maximum in the acoustic frequency range by thermally activated platinum cure is described in Example 5. In some variations, the cure process can be performed using light-promoted platinum catalysis.

Cured Silicone Rubber

The resulting cured silicone rubber is a cure of poly-N1, N2-siloxane polymer and a poly(dimethyl)(diphenyl)siloxane copolymer. In various embodiments, the cured silicone rubber has a maximum damping coefficient (tan δ) of the cured silicone rubber is in the frequency range below 20 kHz.

In the poly-N1,N2-siloxane polymer, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl. The poly-N1,N2-siloxane polymer is also referred to herein as optionally substituted polydimethylsiloxane. The poly-N1,N2-siloxane polymer can be polydimethylsiloxane. It will be recognized that the cured silicone rubber as referred to herein can include some unreacted unsaturated moieties, e.g., vinyl moieties, remaining after curing.

In some variations, the cured silicone rubber has from 1 mol % to 99 mol % copolymer. In some variations, the cured silicone rubber has from 1 mol % to 70 mol % copolymer. In some variations, the cured silicone rubber has from 5 mol % to 50 mol % copolymer. In still other variations the cured silicone rubber has from 10 mol % to 30 mol % copolymer.

The poly(dimethyl)(diphenyl)siloxane copolymer can have an amount of diphenylsiloxane as described herein relating to pre-cured formulations.

In some variations, the cured silicone rubber can have from 1 mol % to 35 mol % diphenylsiloxane. In further variations, the cured silicone rubber can have from 5 mol %-20 mol % diphenylsiloxane. In still further variations, the cured silicone rubber can have from 8 mol %-15 mol % diphenylsiloxane. In additional variations, the cured silicone rubber can have 8 mol %-10 mol % diphenylsiloxane.

In some variations, the maximum of tan δ of the cured silicone rubber is in a frequency range not greater than 20.0 kHz. In some variations, the maximum of tan δ of the cured silicone rubber is in a frequency range not greater than 15.0 kHz. In some variations, the maximum of tan δ of the cured silicone rubber is in a frequency range not greater than 10.0 kHz. In some variations, the maximum of tan δ of the cured silicone rubber is in a frequency range not greater than 5.0 kHz. In some variations, the maximum of tan δ of the cured silicone rubber is in a frequency range not greater than 3.0 kHz. In some variations, the maximum of tan δ of the cured silicone rubber is in a frequency range not greater than 2.0 kHz. In some variations, the maximum of tan δ of the cured silicone rubber is in a frequency range not greater than 1.0 kHz. In some variations, the maximum of tan δ of the cured silicone rubber is in a frequency range not greater than 900 Hz. In some variations, the maximum of tan δ of the cured silicone rubber is in a frequency range not greater than 800 Hz. In some variations, the maximum of tan δ of the cured silicone rubber is in a frequency range not greater than 700 Hz. In some variations, the maximum of tan δ of the cured silicone rubber is in a frequency range not greater than 600 Hz. In some variations, the maximum of tan δ of the cured silicone rubber is in a frequency range not greater than 500 Hz. In some variations, the maximum of tan δ of the cured silicone rubber is in a frequency range not greater than 400 Hz. In some variations, the maximum of tan δ of the cured silicone rubber is in a frequency range not greater than 300 Hz. In some variations, the maximum of tan δ of the cured silicone rubber is in a frequency range not greater than 200 Hz. In some variations, the maximum of tan δ of the cured silicone rubber is in a frequency range not greater than 100 Hz. In some variations, the maximum of tan δ of the cured silicone rubber is in a frequency range not greater than 50 Hz. In some variations, the maximum of tan δ of the cured silicone rubber is in a frequency range not greater than 25 Hz. In some variations, the maximum of tan δ of the cured silicone rubber is in a frequency range not greater than 10 Hz. In some variations, the maximum of tan δ of the cured silicone rubber is in a frequency range not greater than 5.0 Hz. In some variations, the maximum of tan δ of the cured silicone rubber is in a frequency range of not greater than 2.0 Hz.

In some variations, the maximum of tan δ of the cured silicone rubber is in a frequency range of at least 0.5 Hz. In some variations, the maximum of tan δ of the cured silicone rubber is in a frequency range of at least 2.0 Hz. In some variations, the maximum of tan δ of the cured silicone rubber is in a frequency range of at least 5.0 Hz. In some variations, the maximum of tan δ of the cured silicone rubber is in a frequency range of at least 10 Hz. In some variations, the maximum of tan δ of the cured silicone rubber is in a frequency range of at least 25 Hz. In some variations, the maximum of tan δ of the cured silicone rubber is in a frequency range of at least 50 Hz. In some variations, the maximum of tan δ of the cured silicone rubber is in a frequency range of at least 100 Hz. In some variations, the maximum of tan δ of the cured silicone rubber is in a frequency range of at least 200 Hz. In some variations, the maximum of tan δ of the cured silicone rubber is in a frequency range of at least 300 Hz. In some variations, the maximum of tan δ of the cured silicone rubber is in a frequency range of at least 400 Hz. In some variations, the maximum of tan δ of the cured silicone rubber is in a frequency range of at least 500 Hz. In some variations, the maximum of tan δ of the cured silicone rubber is in a frequency range of at least 600 Hz. In some variations, the maximum of tan δ of the cured silicone rubber is in a frequency range of at least 700 Hz. In some variations, the maximum of tan δ of the cured silicone rubber is in a frequency range of at least 800 Hz. In some variations, the maximum of tan δ of the cured silicone rubber is in a frequency range of at least 900 Hz. In some variations, the maximum of tan δ of the cured silicone rubber is in a frequency range of at least 1.0 kHz. In some variations, the maximum of tan δ of the cured silicone rubber is in a frequency range of at least 2.0 kHz. In some variations, the maximum of tan δ of the cured silicone rubber is in a frequency range of at least 3.0 kHz. In some variations, the maximum of tan δ of the cured silicone rubber is in a frequency range of at least 5.0 kHz. In some variations, the maximum of tan δ of the cured silicone rubber is in a frequency range of at least 10.0 kHz.

The cured silicone rubber can include additional components such as components from a polymerization reaction. In some variations, the cured silicone rubber can include a filler material such as carbon black, fumed silica, or titanium dioxide.

Apparatuses

In some variations, vibrational feedback of particular low frequencies should not be damped by the device. For example, in handheld devices vibrational feedback of low frequencies is not damped, while high frequency disharmonic overtones emitted by loudspeakers can be damped.

Figure 6:
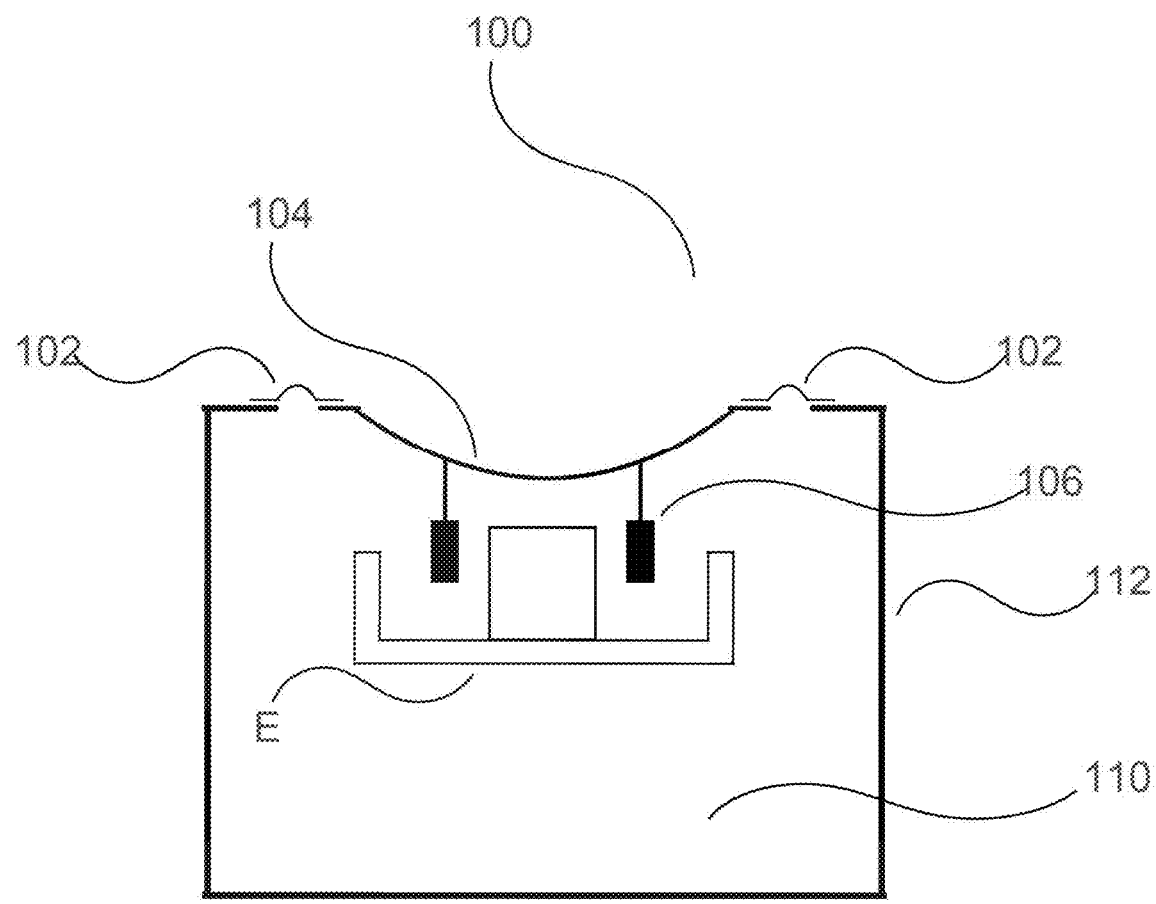
FIG. 6 illustrates a cross-sectional view of a speaker, in accordance with various aspects of the subject technology.

FIG. 6 illustrates a speaker 100, in accordance with various aspects of the subject technology. The speaker 100 can be used in any type of handheld electronic device. Speaker 100 includes cured silicone rubber membrane 102 made of cured rubber silicone. Rubber membrane 102 holds diaphragm 104. Magnetic assembly 108 is located in cavity 110 enclosed by housing 112. An electric current running through coils 106 (e.g., copper coils) generates a magnetic field that interacts with and magnetic assembly. Diaphragm 104 oscillates in magnetic assembly 108 to create sound.

Cured silicone rubber membrane 102 can damps sound at a particular frequency or range of frequencies. Speaker 100 can show unfavorable oscillation modes of diaphragm 104, leading to a distorted acoustic output. A reduction of the amplitudes of these modes by damping improves therefore the quality of the sound.

The high damping properties of the cured silicone rubber, that can be selectively tunable based on diphenylsiloxane content over a wide frequency range, such as 1-20000 Hz can be adapted to damping conditions.

EXAMPLES

The following non-limiting examples are included to demonstrate certain embodiments of the present disclosure. It should be appreciated by those of skill in the art that the techniques disclosed in the examples which follow represent techniques discovered by the inventors to function well in the practice of the subject matter of the present. However, those of skill in the art should, in light of the present disclosure, appreciate that many changes can be made to the specific embodiments disclosed herein and still obtain a like or similar result without departing from the spirit and scope of the subject matter of the present disclosure.

All operations with air- or moisture-sensitive compounds were performed in an atmosphere of dry nitrogen. Molecular weight of the polymers was measured by GPC, using ELSD detector (Agilent) and a calibration curve (PDMS as standards for calibration, THF as eluent at ambient temperature). Molar content of diphenylsiloxane was determined from the polymer refractive index, using a calibration curve and commercial samples of poly(dimethyl-diphenylsiloxane) as standards for calibration. Commercially available reagents and solvents were used without additional purification.

Example 1

Synthesis of vinyl-terminated poly(dimethyl-diphenyl)siloxane with diphenylsiloxane Content 37.4 Mol %

Figure 2A:
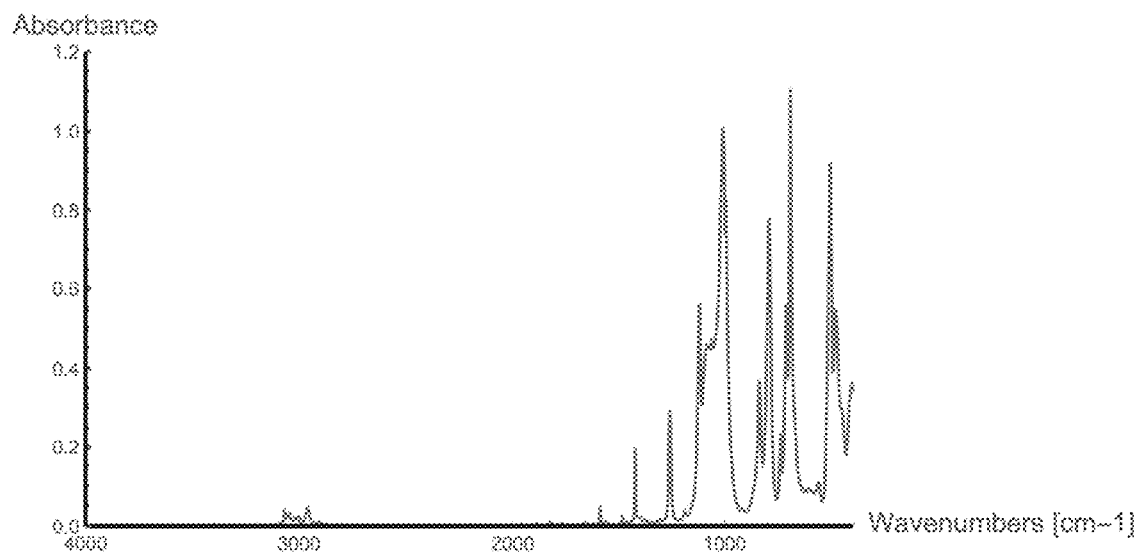
FIG. 2A depicts an infra-red (IR) spectrum from wavelengths 4000 to 400 $cm^{-1}$ of the vinyl-terminated poly(dimethyl-diphenyl)siloxane with a diphenylsiloxane content of 37.4 mol %.
Figure 2B:
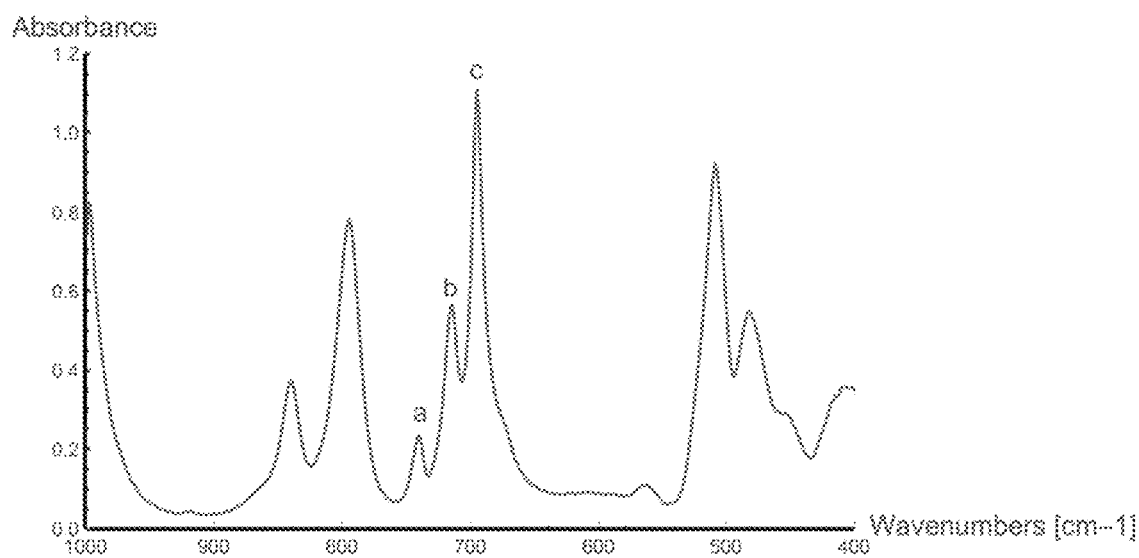
FIG. 2B depicts an expanded view of the IR spectrum of FIG. 2A from wavelengths 1000 $cm^{-1}$ to 400 $cm^{-1}$.

Into a jar of a ball mill was placed 75 g of octaphenylcyclotetrasiloxane, 30 g octamethylcyclotertasiloxane and 40 8-mm polished steel balls. Milling was performed for 20 min at 800 rpm. The obtained paste was transferred into a 0.5 L round-bottom flask with a magnetic stirrer bar, air was changed for nitrogen, and 1 mL of 33% solution of potassium hexamethyldisilazide (KHMDS) in 1,3-dimethylimidazolidinone was added. The reaction was heated and stirred at 150° C. for 30 min. During that time, the mass gradually melted and transformed into a transparent viscous liquid. To the flask, 210 mL of dry 2-methyltetrahydrofuran was added. Stirring was continued, and when the viscous product dissolved completely, 5 mL of triethylamine and 2 mL of vinyldimethylchlorosilane was added. The reaction was stirred overnight, transferred into a 1 L separation funnel, and 450 mL of iso-butanol was added in portions with shaking. After 1 h, the lower layer was separated, redissolved in 150 mL of 2-methyltetrahydrofuran, the polymer precipitated by addition of 250 mL of iso-butanol, and dried in vacuum. The obtained polymer has Mw 40-45 kDa, diphenylsiloxane content 37.4 mol %, purity >98%. Yield 58-60%. IR spectra of the polymer are depicted in FIGS. 2A and 2B. Three absorption bands are assigned to diphenyl-groups bound to a siloxane backbone located at 740±5, 720±5, and 700±5 $cm^{-1}$ as known in the art are clearly visibly in rising intensity with decreasing wavenumbers. Bands are labeled by "a", "b" and "c". The band at 700 $cm^{-1}$ reaches an absorption value of 1.

For ambient temperature preparation of the cured rubber composition with a maximal damping in the acoustic frequency range, 10 g of the Poly(dimethyl-diphenyl)siloxane prepared as above was mixed with 35 g of commercial vinyl-terminated polydimethylsiloxane with Mw 62.7 kDa, 0.72 g of commercial mercaptopropysiloxane oligomer (SMS-992 from Gelest), 0.5 mL of 10% solution of Irgacure TPO in tetrahydrofuran (THF), and 5.0 g of Aerosil R202 from Evonik. The mass was thoroughfully mixed in a SpeedMixer. A sample was cured using Anton Paar rheometer by UV-irradiation at 25° C., using UV-light with 365 nm wavelength and intensity 0.950 $W/cm^2$ for 30 sec. UV-Light was switched on at 10 seconds, after 20 seconds the viscosity reached a plateau indicating the end of the curing reaction. The sample was completely cured under these conditions.

Figure 5A:
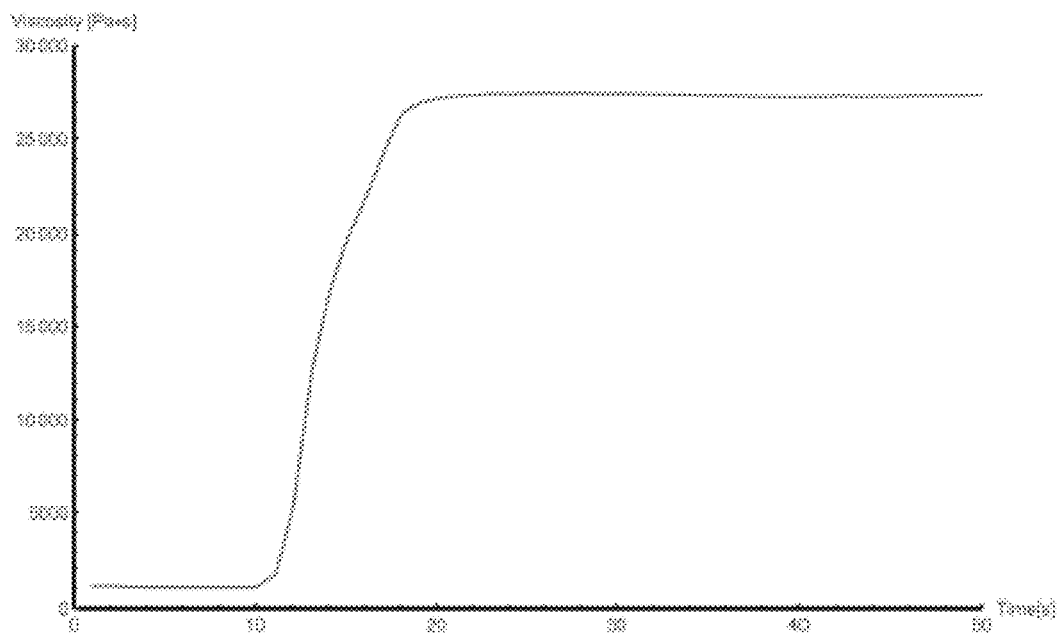
FIG. 5A depicts the viscosity versus time of the silicone rubber curing process.
Figure 5B:
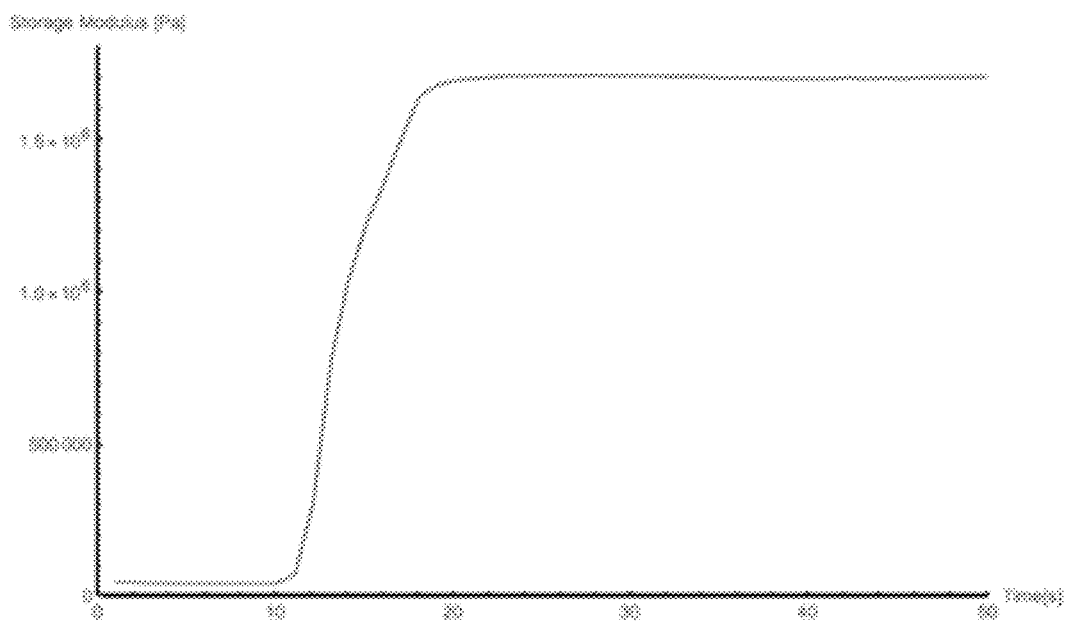
FIG. 5B depicts the storage modulus versus time of the silicone rubber curing process.

FIG. 5A depicts the viscosity versus time of the rubber formulation as measure of the progress of the curing process. Data were gathered by a rheometer. FIG. 5B depicts the storage modulus versus time of the silicone rubber curing process.

Figure 3A:
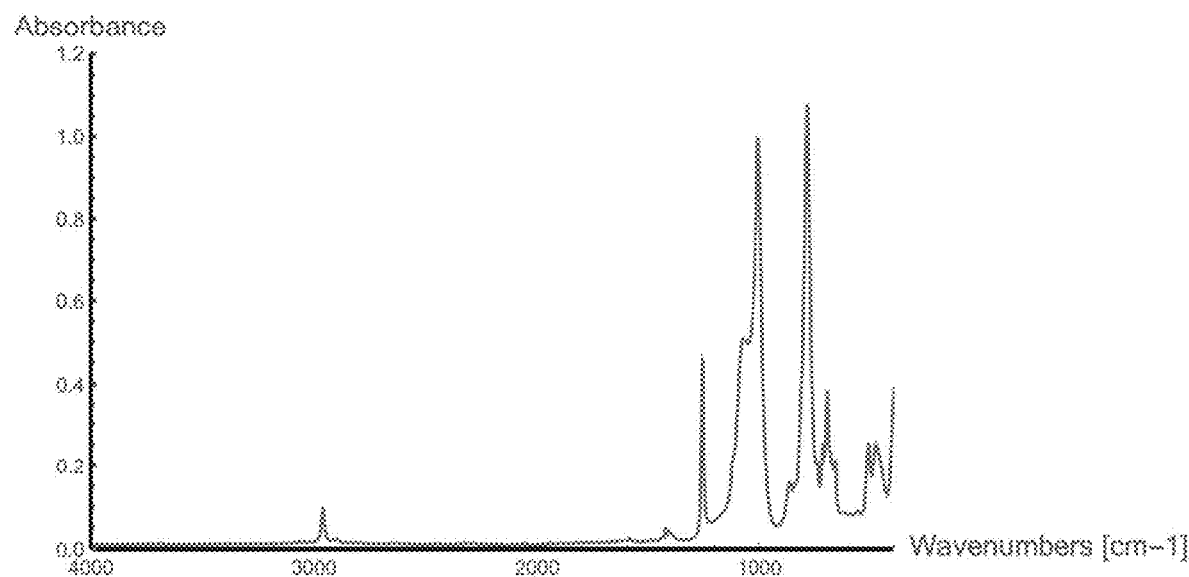
FIG. 3A depicts an IR spectrum from wavelengths 4000 cm$^{-1}$ to 400 cm$^{-1}$ of a cured silicone rubber using 20% poly(dimethyl)(diphenyl)siloxane with a diphenylsiloxane content of 37.4 mol %.
Figure 3B:
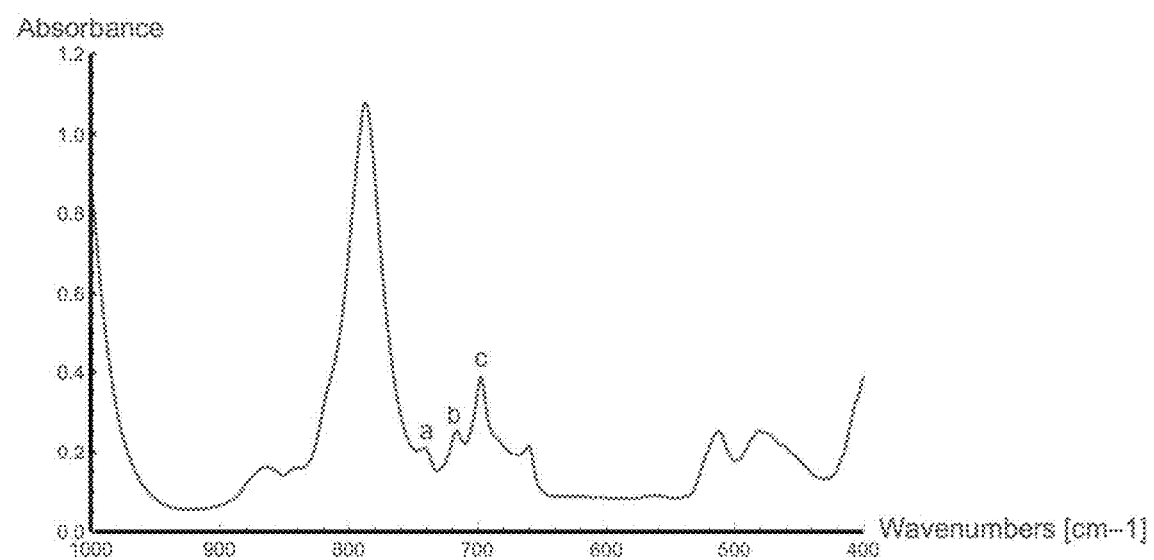
FIG. 3B illustrates an expanded view of the IR spectrum of FIG. 3A from wavelengths 1000 cm$^{-1}$ to 400 cm$^{-1}$.

The maximum of the tan δ-frequency curve for this material corresponds the frequency of 800 Hz. IR spectra of the cured silicone rubber are depicted in FIGS. 3A and 3B. Three absorption bands assigned to diphenylgroups as known in the art, located at 740±5 ("a"), 720±5 ("b") and 700±5 ("c") cm$^{-1}$ are clearly visibly in rising intensity with decreasing wavenumbers. Bands are labeled by "a", "b" and "c". The band at 700 cm$^{-1}$ reaches an absorption value of 0.41.

Example 2

Synthesis of vinyl-terminated poly(dimethyl-diphenyl)siloxane with diphenylsiloxane Content 44.4 Mol %

Into a jar of a ball mill was placed 100 g of octaphenyl-cyclotetrasiloxane, 20 g of octamethylcyclotertasiloxane and 40 8-mm polished steel balls. Milling was performed for 20 min at 800 rpm. The obtained paste was transferred into a 0.5 L round-bottom flask with a magnetic stirrer bar, air changed for nitrogen, and 1.5 mL of 33% solution of KHMDS in 1,3-dimethylimidazolidinone was added. The reaction was heated and stirred at 150° C. for 30 min. During that time the mass gradually melted and transformed into a transparent viscous liquid. The flask was cooled, and 240 mL of dry 2-methyltetrahydrofuran was added. Stirring was continued, and when the product dissolved, 5 mL of triethylamine and 2 mL of vinyldimethylchlorosilane was added. The reaction was stirred overnight, transferred into a 1 L separation funnel, and 500 mL of iso-amyl alcohol was added in portions with shaking. After 1 h, the lower layer was separated, redissolved in 200 mL of 2-methyltetrahydrofuran, the polymer precipitated by addition of 300 mL of iso-amyl alcohol, and dried in vacuum. The obtained polymer has Mw 32-35 kDa, diphenylsiloxane content 44.4 mol %, purity >98%. Yield 52-54%.

Figure 4A:
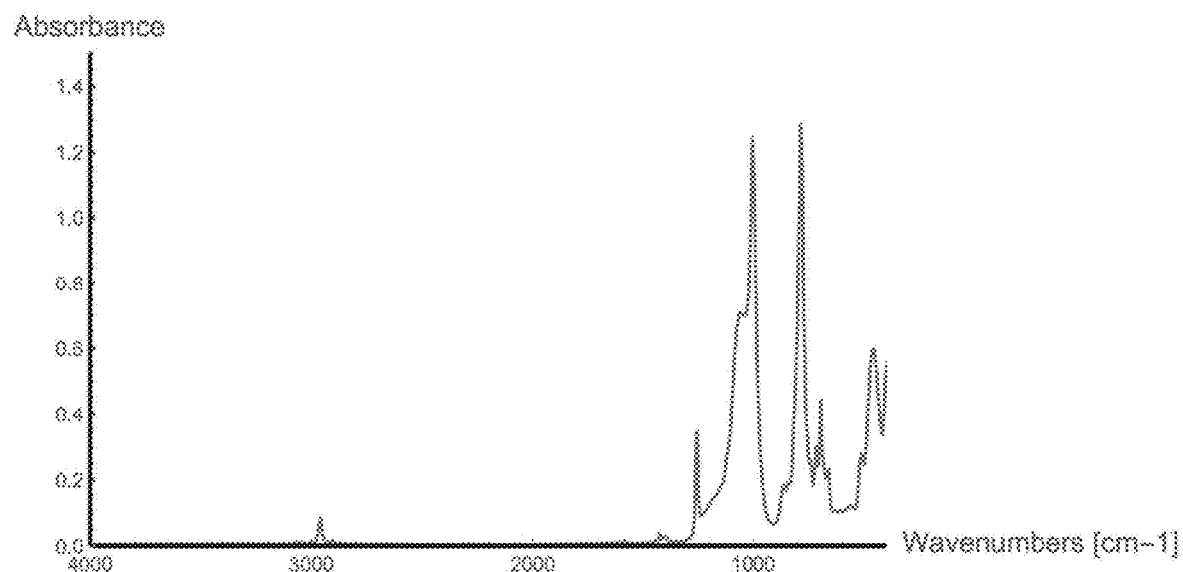
FIG. 4A depicts an IR spectrum from wavelengths 4000 cm$^{-1}$ to 400 cm$^{-1}$ of a cured silicone rubber comprising 20% poly(dimethyl-diphenyl)siloxane with a diphenylsiloxane content of 44.4 mol %.
Figure 4B:
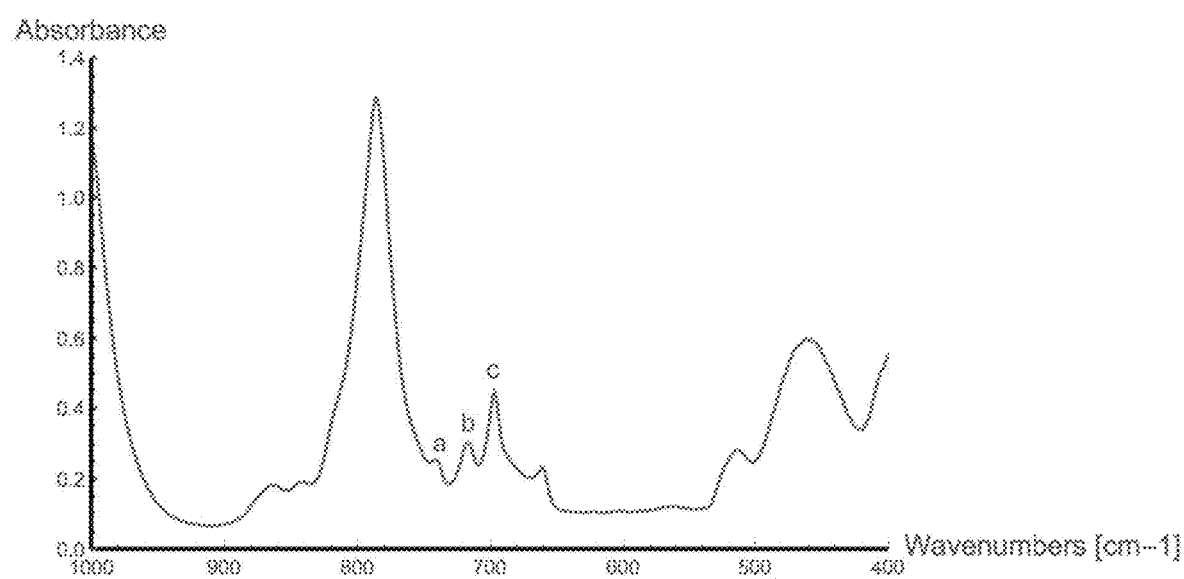
FIG. 4B depicts an expanded view of the IR spectrum of FIG. 4A from wavelengths 1000 cm$^{-1}$ to 400 cm$^{-1}$.

10 g of the Poly(dimethyl-diphenyl)siloxane prepared as above was mixed with 35 g of a commercial vinyl-terminated polydimethylsiloxane premixed with a silica filler, 0.70 g of commercial mercaptopropylsiloxane oligomer (SMS-992 from Gelest), 0.5 mL of 10% solution of Irgacure TPO in THF, and 5.0 g of Aerosil OX50 from Evonik. The mass was thoroughfully mixed in a SpeedMixer. A sample was cured using Anton Paar rheometer by UV-irradiation at 25° C., using UV-light with 365 nm wavelength and intensity 0.950 W/cm$^2$ for 30 sec. The sample was completely cured under these conditions. The maximum of the tan δ-frequency curve for this material corresponds the frequency 10 Hz. IR spectra of the polymer are depicted in FIGS. 4A and 4B. Three absorption bands assigned to diphenylgroups as known in the art, located at 740±5 ("a"), 720±5 ("b") and 700±5 ("c") cm$^{-1}$ are clearly visibly in rising intensity with decreasing wavenumbers. Bands are labeled by "a", "b" and "c". The band at 700 cm$^{-1}$ reach an absorption value of 0.42.

Example 3

The procedure described in Example 2 was followed, however, the diphenyl content of the vinyl-terminated poly(dimethyl-diphenyl) compound was adjusted during the synthesis to 40.9%. The maximum of the tan δ-frequency curve for the obtained material corresponds the frequency 50 Hz.

Example 4

Rheometer and DMA Measurements are described.

Viscosity curves of uncured rubber and UV-curing curves were recorded on a Anton Paar MCR 702 rheometer equipped with a Delolux 80/365 UV-light source on the lower side.

Measurements were performed in plate-plate configuration with a shear deformation controlled oscillatory test at a frequency of 10 Hz. Shear deformation was set to 0.1% for all measurements. Upper plate was a PP25 with a diameter of 25 mm, lower plate was a UV-transparent glass plate from Anton Paar. Delolux 80/365 was providing UV light for curing with a nominal wavelength of 365 nm and an intensity of 950 mW/cm$^2$ measured at the surface of the transparent glass plate on the lower side of the rheometer. The UV intensity was periodically monitored with a DeloluxControll measuring head with a diameter of 9 mm.

Viscosity curves of uncured rubber were recorded at a constant temperature of 25° C., a frequency of 10 Hz and a shear deformation of 0.1%. UV-curing curves were recorded at a constant temperature of 25° C., a frequency of 10 Hz and a shear deformation of 0.1%.

UV curing was done for 30 s at an intensity of 950 mW/cm2.

Cured specimen were removed from the rheometer and further cut into shape for DMA testing. Specimen were cut for DMA testing by hand using guillotine shears, metal ruler and scalpel blades to fit DMA sample holder.

DMA curves were recorded on a Mettler Toledo DMA/SDTA 1+. All DMA measurements were performed in tensile mode using a deformation-controlled sinusoidal signal at 1% deformation. The clamped specimen length was predetermined by the specimen holder and fixed at 9 mm. Initial specimen were of 20 mm to 25 mm length, 3 mm to 5 mm width and 0.5 mm to 1 mm thickness.

Specimen were clamped in the specimen holder using textured brackets to prevent from slipping. Excessive material of the specimen was removed with scalpel blades to prevent from unintentional contact with the specimen holder. The specimen holder with the mounted specimen in place were then fixed in the DMA for testing.

DMA strain sweeps were recorded in the range of 0.1% to 10% deformation at a temperature of 25° C. and a test frequency of 1 Hz.

To create master curves, isothermal frequency sweeps were performed using a deformation-controlled sinusoidal signal at 1% deformation. Isothermal frequency sweeps were recorded in a range of 0.1 Hz to 100 Hz. At least 20 isothermal segments were recorded in a temperature range of −38° C. to +40° C. Isothermal frequency sweeps were fitted according to WLF theory to create master curves.

TABLE 1

| Denotation in figures | Sample preparation described in example No. | Diphenyl siloxane content in vinyl-terminated poly(dimethyl)(diphenyl)siloxane | Tan δ maximum |
| --- | --- | --- | --- |
| A | 1 | 37.4% | 800 Hz |
| B | 3 | 40.9% | 50 Hz |
| C | 2 | 44.4% | 10 Hz |

Figure 1B:
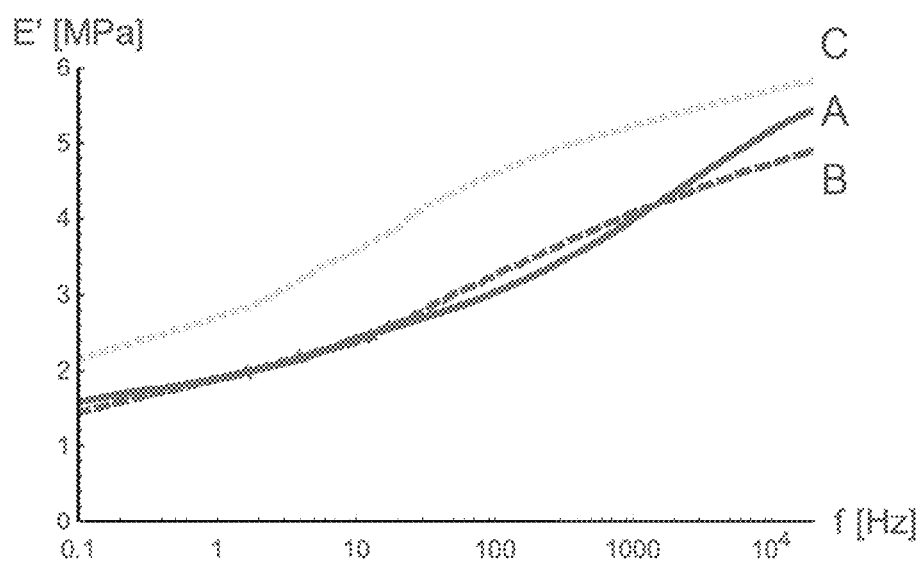
FIG. 1B depicts the Storage-Modulus determined from the WLF-Equation the three cured silicone rubbers depicted in Table 1.

FIG. 1A depicts the tangent of the loss angle (tan δ) for the three cured silicone rubbers. Tan δ maximum of each cured silicone rubber varied based on the percentage of phenyl in the poly(dimethyl)(diphenyl)siloxane. The damping maximum can be controlled or tuned. FIG. 1B separately depicts the Storage-Modulus determined from the WLF-Equation the three cured silicone rubbers depicted in Table 1 as labeled A, B, and C.

Example 5

Figure 7A:
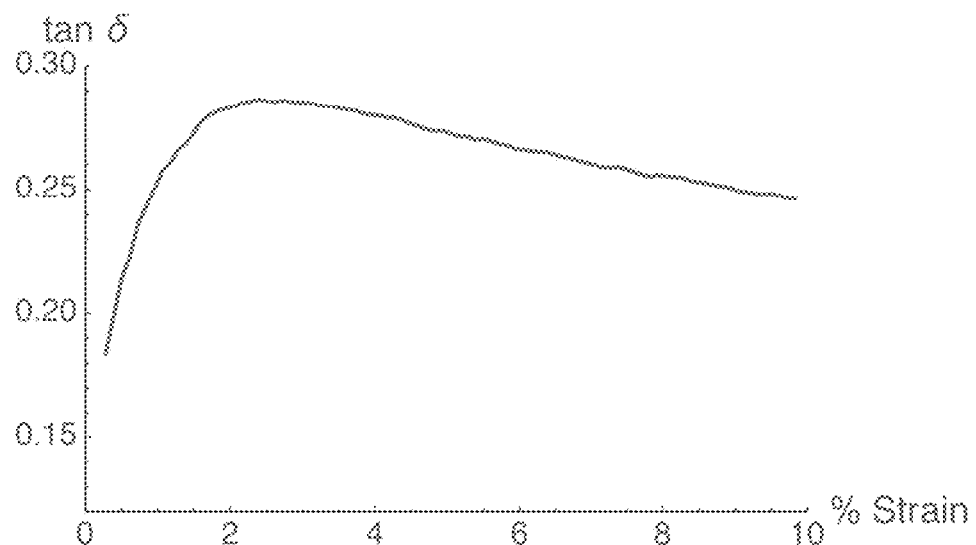
FIG. 7A depicts the tan δ versus strain for a cured silicone rubber.
Figure 7B:
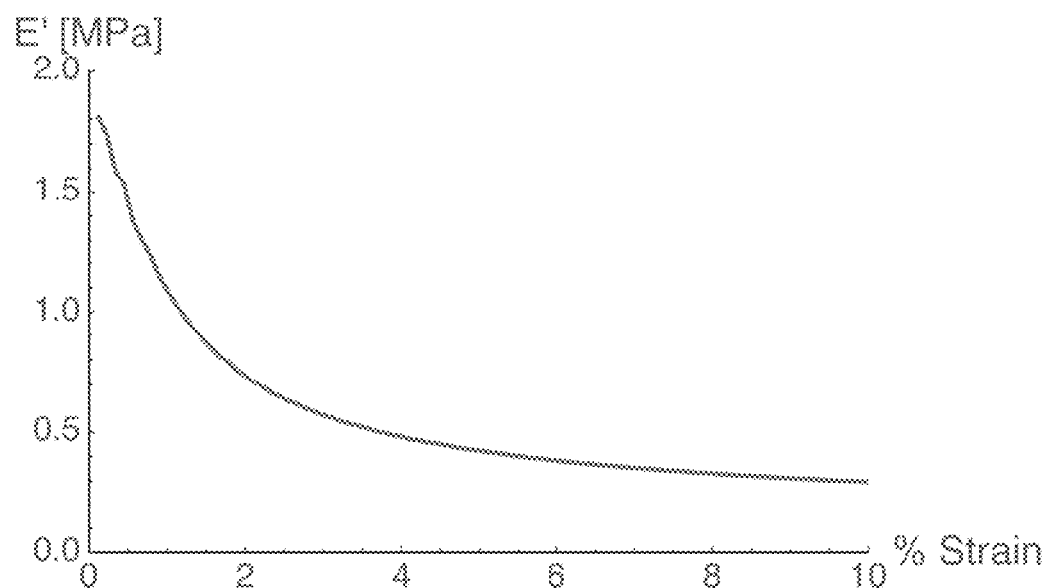
FIG. 7B depicts the Tensile Modulus versus strain depicted as obtained in Example 5.

Preparation of Thermally Curable Siloxane Composition with Maximal Damping in Acoustic Frequency Range 10 g of the Poly(dimethyl-diphenyl)siloxane prepared as in Example 2 was mixed with 35 g of a commercial vinyl-terminated polydimethylsiloxane, 1.00 g of commercial methylhydrosiloxane-dimethylsiloxane copolymer (HMS-H21 from Gelest), 0.1 mL of THF solution of Karstedt catalyst with Pt content 0.1 mg/mL, and 5.0 g of fumed silica filler OX50 from Evonik. The mass was thoroughly mixed in a SpeedMixer. A sample was cured using Anton Paar rheometer at 130° C. for 5 min. A rubber with good damping properties was obtained. Tan δ versus strain of the rubber is depicted in FIG. 7A, and tensile modulus versus strain of the rubber is depicted in FIG. 7B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A cured silicone rubber comprising:
   1-99 mol % poly-N1,N2-siloxane polymer, wherein, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl; and
   1-99 mol % poly(dimethyl)(diphenyl) siloxane copolymer comprising 5 mol %-20 mol % diphenylsiloxane.

2. The cured silicone rubber of claim 1, wherein the poly-N1,N2-siloxane polymer is polydimethylsiloxane.

3. The cured silicone rubber of claim 1, comprising 1 mol % to 70 mol % of the copolymer.

4. The cured silicone rubber of claim 1, comprising 1 mol % to 35 mol % diphenylsiloxane.

5. The cured silicone rubber of claim 1, further comprising a filler material.

6. An audio speaker comprising the cured silicone rubber of claim 1, operably linked to a diaphragm.

7. An apparatus comprising the audio speaker of claim 6.

8. A method of making the cured silicone rubber of claim 1, comprising:
   combining octaphenylcyclotetrasiloxane, octamethylcyclotetrasiloxane, potassium hexamethyldisilazide, and a promotor to form a mixture;
   polymerizing the octaphenylcyclotetrasiloxane and octamethylcyclotetrasiloxane to obtain a copolymer; and
   functionalizing the copolymer to form a copolymer bearing an unsaturated moiety.

9. A cured silicone rubber comprising:
   1-99 mol % poly-N1,N2-siloxane polymer, wherein, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl; and
   1-99 mol % poly(dimethyl) (diphenyl) siloxane copolymer comprising 30 mol % to 50 mol % diphenylsiloxane.

10. The cured silicone rubber of claim 9, wherein the poly-N1,N2-siloxane polymer is polydimethylsiloxane.

11. The cured silicone rubber of claim 9, comprising 1 mol % to 70 mol % of the copolymer.

12. The cured silicone rubber of claim 9, comprising 1 mol % to 35 mol % diphenylsiloxane.

13. The cured silicone rubber of claim 9, wherein the poly(dimethyl)(diphenyl) siloxane copolymer –20 mol % diphenylsiloxane.

14. The cured silicone rubber of claim 9, further comprising a filler material.

15. An audio speaker comprising the cured silicone rubber of claim 9, operably linked to a diaphragm.

16. An apparatus comprising the audio speaker of claim 15.

17. A method of making the cured silicone rubber of claim 9, comprising:
   combining octaphenylcyclotetrasiloxane, octamethylcyclotetrasiloxane, potassium hexamethyldisilazide, and a promotor to form a mixture;
   polymerizing the octaphenylcyclotetrasiloxane and octamethylcyclotetrasiloxane to obtain a copolymer; and
   functionalizing the copolymer to form a copolymer bearing an unsaturated moiety.

18. A cured silicone rubber comprising:
   1-99 mol % poly-N1,N2-siloxane polymer, wherein, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl; and
   1-99 mol % poly(dimethyl) (diphenyl) siloxane copolymer comprising 5 mol %-70 mol % diphenylsiloxane, wherein a maximum damping coefficient (tan δ) of the cured silicone rubber is in the frequency range below 20 KHz.

19. The cured silicone rubber of claim 18, wherein the poly-N1,N2-siloxane polymer is polydimethylsiloxane.

20. The cured silicone rubber of claim 18, comprising 1 mol % to 70 mol % of the copolymer.

21. The cured silicone rubber of claim 18, comprising 1 mol % to 35 mol % diphenylsiloxane.

22. The cured silicone rubber of claim 18, further comprising a filler material.

23. The cured silicone rubber of claim 18, wherein the copolymer comprises from 30 mol % to 50 mol % diphenylsiloxane.

24. The cured silicone rubber of claim 18, comprising 1 mol % to 35 mol % diphenylsiloxane.

25. The cured silicone rubber of claim 18, comprising 5 mol %-20 mol % diphenylsiloxane.

26. The cured silicone rubber of claim 18, further comprising a filler material.

27. An audio speaker comprising the cured silicone rubber of claim 18, operably linked to a diaphragm.

28. An apparatus comprising the audio speaker of claim 27.

29. A method of making the cured silicone rubber of claim 18, comprising:
   combining octaphenylcyclotetrasiloxane, octamethylcyclotetrasiloxane, potassium hexamethyldisilazide, and a promotor to form a mixture;
   polymerizing the octaphenylcyclotetrasiloxane and octamethylcyclotetrasiloxane to obtain a copolymer; and
   functionalizing the copolymer to form a copolymer bearing an unsaturated moiety.

30. A formulation comprising:
   1-99 mol % of copolymer of poly(dimethyl)(diphenyl) siloxane comprising between 5 and 70 mol % diphenylsiloxane, the copolymer bearing an unsaturated moiety; and
   1-99 mol % poly-N1,N2-siloxane polymer bearing the unsaturated moiety, wherein N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl, wherein the copolymer comprises between 30 mol % and 50 mol % diphenylsiloxane.

31. The formulation of claim 30, wherein the unsaturated moiety is a vinyl substituent.

32. The formulation of claim 30, wherein the copolymer comprises from 5 mol % to 50 mol % diphenylsiloxane.

33. The formulation of claim 30, further comprising a catalyst.

34. An audio speaker comprising the cured silicone rubber of claim 30, operably linked to a diaphragm.

35. An apparatus comprising the audio speaker of claim 34.

36. A method of making the cured silicone rubber of claim 30, comprising:
   combining octaphenylcyclotetrasiloxane, octamethylcyclotetrasiloxane, potassium hexamethyldisilazide, and a promotor to form a mixture;
   polymerizing the octaphenylcyclotetrasiloxane and octamethylcyclotetrasiloxane to obtain a copolymer; and
   functionalizing the copolymer to form a copolymer bearing an unsaturated moiety.

37. A formulation comprising:
   1-99 mol % of copolymer of poly(dimethyl)(diphenyl) siloxane comprising between 5 and 70 mol % diphenylsiloxane, the copolymer bearing an unsaturated moiety; and
   1-99 mol % poly-N1,N2-siloxane polymer bearing the unsaturated moiety, wherein N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl; and
   a curing agent having a thiol or a hydridosilane moiety.

38. The formulation of claim 37, wherein the unsaturated moiety is a vinyl substituent.

39. The formulation of claim 37, wherein the copolymer comprises from 5 mol % to 50 mol % diphenylsiloxane.

40. The formulation of claim 37, further comprising a catalyst.

41. An audio speaker comprising the cured silicone rubber of claim 37, operably linked to a diaphragm.

42. An apparatus comprising the audio speaker of claim 41.

43. A method of making the cured silicone rubber of claim 37, comprising:
   combining octaphenylcyclotetrasiloxane, octamethylcyclotetrasiloxane, potassium hexamethyldisilazide, and a promotor to form a mixture;
   polymerizing the octaphenylcyclotetrasiloxane and octamethylcyclotetrasiloxane to obtain a copolymer; and
   functionalizing the copolymer to form a copolymer bearing an unsaturated moiety.

44. A method of making a cured silicone rubber comprising:
   combining a formulation comprising:
      1-99 mol % of copolymer of poly(dimethyl)(diphenyl) siloxane comprising between 5 and 70 mol % diphenylsiloxane, the copolymer bearing an unsaturated moiety; and
      1-99 mol % poly-N1,N2-siloxane polymer bearing the unsaturated moiety, wherein N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl and
      a photoinitiator to form a mixture; and
   applying ultraviolet radiation to the mixture at an ambient temperature to form the cured silicone rubber;
   the cured silicone rubber comprising:
      1-99 mol % poly-N1,N2-siloxane polymer, wherein, on each separate silicon atom, N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl; and
      1-99 mol % poly(dimethyl)(diphenyl) siloxane copolymer comprising 5 mol %-70 mol % diphenylsiloxane.

45. The method of claim 44, further comprising adding a curing agent to the formulation.

46. A method of making a cured silicone rubber, the method comprising:
   combining octaphenylcyclotetrasiloxane, octamethylcyclotetrasiloxane, potassium hexamethyldisilazide, and a promotor to form a mixture;
   polymerizing the octaphenylcyclotetrasiloxane and octamethylcyclotetrasiloxane to obtain a copolymer;
   functionalizing the copolymer to form a copolymer bearing an unsaturated moiety;
   dissolving the copolymer in a solvent;
   adding a silytion agent and a base; and
   precipitating the polymer; and
   the cured silicone rubber comprising:
      1-99 mol % of copolymer of poly(dimethyl)(diphenyl) siloxane comprising between 5 and 70 mol % diphenylsiloxane, the copolymer bearing an unsaturated moiety; and
      1-99 mol % poly-N1,N2-siloxane polymer bearing the unsaturated moiety, wherein N1 and N2 are each independently selected from the group consisting of substituted or unsubstituted methyl, ethyl, propyl, butyl, pentyl, hexyl, heptyl, octyl, nonyl, phenyl, phenylethyl, and trifluoropropyl.

\* \* \* \* \*